Patented Aug. 7, 1928.

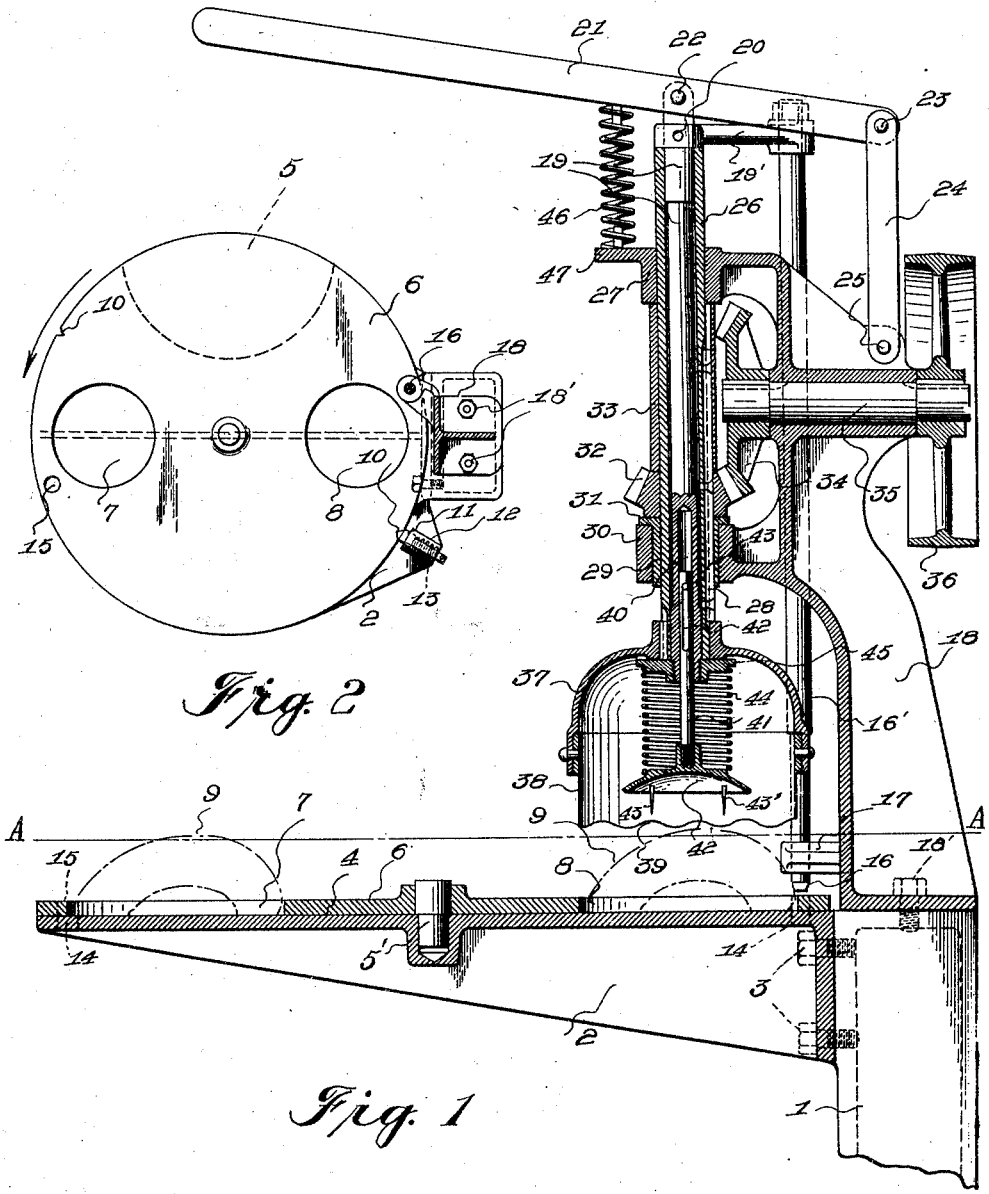

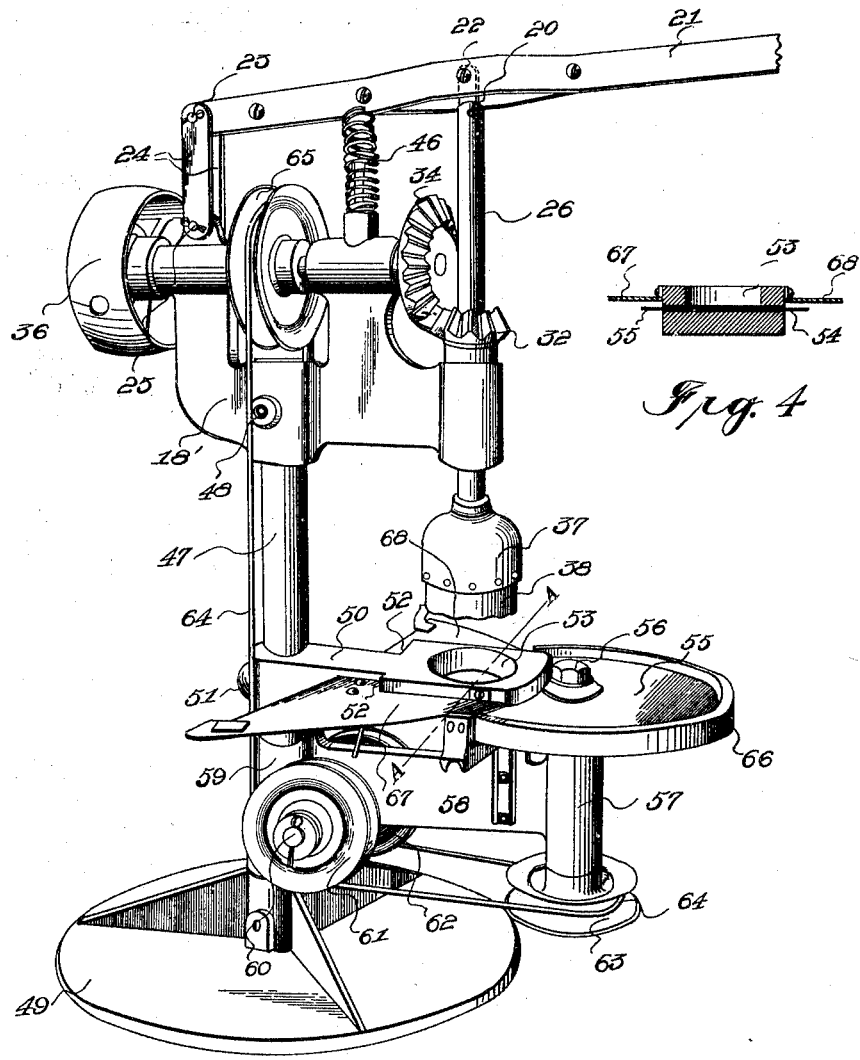

1,679,817

UNITED STATES PATENT OFFICE.

ARTHUR L. DUNCAN, OF PIEDMONT CALIFORNIA.

METHOD AND APPARATUS FOR TRIMMING FRUIT.

Application filed April 7, 1926. Serial No. 100,312.

The present invention relates to methods and apparatus for trimming fruit.

More particularly the invention relates to methods and apparatus for trimming exterior projections and irregularities from the pulp of divided or halved and pitted or cored fruits, such for example, as peaches, and the like. In natural formation of single pit fruits, such as peaches, and the like, a spike or tip forms on the pulp of the fruit opposite the stem end of the fruit, and substantially in line with the spike of the pit, and a natural crease is formed in the pulp of the fruit, substantially in the plane of the fin edge or suture of the pit. Besides the spike or tip formed on the pulp, irregularities frequently occur usually in the plane of the crease which render the fruit objectionable for high grade canning purposes. It is the custom in canning fruit of this character to halve the fruit in the plane of the crease, and the pit is removed therefrom in well known manner. The fruit halves are then treated with lye to remove the skin. For high grade canned fruits, the tip or spike projection of the pulp is removed and the halved pulp sections of the fruit are graded usually in well known types of automatic grading machines in which by a shaking operation the halved fruits are conveyed loosely over a series of screens with holes of different diameters and the halves drop through the screen holes conforming to their diameter. In this way the fruit halves are sorted or graded into substantially uniform sizes. The graded fruit is then conveyed to multiple canning tables, a table being provided for each grade of fruit being canned. At the canning tables, operators, usually women, divert as much fruit as is desired from the conveyor to bins provided for this purpose. The operators pick up each individual halved fruit from the bins, inspecting it carefully and the fruit which is free from objectionable irregularities and properly trimmed is placed in cans. Objectionable fruit halves are rejected and are thrown into cull receptacles from which the rejected fruit is conveyed to pie kettles or slicing machines to be treated in a different manner from the prime fruit or first grade fruit. Because of the rough jolting and handling in the peeling and grading machines, many of the fruit halves which should make fancy fruit, especially the fruit such as peaches which are inclined to be on the ripe side, become frayed and unsightly, and are thrown into the cull receptacle with the naturally deformed and objectionable fruit. In the pie kettles and the slicing machines, the fruit is reduced at a great deal of extra labor to lower grades of canned goods.

The amount of fruit which is injured in quality by rough handling in the peeling machines, and jostling in passing through the graders, is very large with the result that in a cannery as high as 10 per cent or more of the fruit passing through the grading machine is injured in quality and must be made into lower grade fruit.

In accordance with my invention, I have found that it is feasible to treat the fruit halves in such a manner that the halves are reduced to a uniform size, and the deformities and irregularities, including the tip or spike projection on the pulp may be removed. In this way the fruit halves are reduced to uniform sizes of high grade appearance and may be made into fancy grades of canned fruit. While my method of reducing the fruit to uniform sizes of regular shape may be carried out by hand, the amount of hand labor necessary to trim even the culled and rejected fruits can not be secured during the canning season under present conditions. I have accordingly devised an apparatus for rapidly trimming the pulp halves into circular shape and removing the unsightly irregularities at the edges of the halves in rapid manner. While all of the fruit canned may be trimmed in accordance with my invention, I prefer to limit the application thereof to the culled or rejected fruit. By utilizing my improved rapid trimming apparatus and method, the labor involved is reduced to such an extent that one operator can readily handle all of the rejected or culled fruits from a multiple table of nine or more bins. In this way the culled fruit may be trimmed to fancy grades of smaller sizes at a small cost, and the amount of fruit which must be reduced to sliced or pie goods is materially reduced. As the rejected or culled fruits from a given canning table are of substantially uniform size they may accordingly be reduced to fancy grades of a uniformly smaller size, and my invention is preferably carried out by providing an improved trimming device for each multiple canning table, which is manipulated by a single operator. Instead of passing the culled fruit to the pie kettles or to the slicing machines, the fruit culled at each multiple table is conveyed or carried to the trimming device allotted thereto and the operator trims off the irregularity on the fruit fit for this operation reducing it to prime fruit of smaller sizes. The fruit which is trimmed in this manner is carried to the canning table at which the particular size of fruit to which the trimmed fruit has been conveyed is being handled and passes as fine fruit. The trimmings and the remaining fruit not fit to be trimmed are passed to the slicing machines or pie kettles.

Accordingly a primary object of my invention is to provide novel methods and apparatus for trimming fruit halves into regular shapes and uniform sizes.

Another object of the invention is to provides novel methods and apparatus for converting frayed and irregular rejected fruit halves from which the pits have been removed, into trimmed fruit fit for high grade canning.

Still another object of the invention is the provision of novel trimming and cutting apparatus for rapidly and efficiently trimming fruit halves into uniform sizes.

Still further objects of the invention will appear hereinafter in the detailed description of the preferred embodiments of the invention, and are such as are defined by the terms of the appended claims.

Referring to the drawings:

Figure 1 is a sectional elevation through a preferred form of the apparatus for carrying out the trimming operations in accordance with my invention.

Figure 2 is a sectional view reduced in size, taken along line A—A of Figure 1.

Figure 3 is a perspective view showing the modified form of the apparatus for carrying out my method.

Figure 4 is a sectional view on line A—A of Figure 3.

As shown in Figures 1 and 2, a suitable base supporting casting 1 is provided to which a table 2 is secured by means of the studs 3. The table 2 is provided with an upper flat surface 4 in which the semi-circular discharge opening 5 for the trimmed fruit is formed. Supported in the center of the surface 4 is a stub shaft or spindle 5' upon which the plate 6 is journaled for rotation. The plate or turn table 6 is provided with fruit receiving and confining recesses or holes 7 and 8, each of the proper diameter to receive the fruit halves 9 to be trimmed and as indicated by the broken line. Formed at diametrically opposite points in the edge of the disc or plate 6 are the V-shaped locating notches 10 in which the V-shaped end of plunger 11 is adapted to seat. The plunger 11 is seated in a bore formed in a suitable projection 12 of the table 2, and is forced against the edge of plate 6 by means of a helical spring 13. Drilled in the table 2 is a registering hole 14, which when the end of the plunger 11 is seated in one of the notches 10, is in alignment with one of the holes 15 drilled through the plate 6. Disposed in alignment with and directly above the hole 14 is the end 16 of a registering rod 16'. The registering rod 16' is slidably supported and guided for vertical reciprocation in an extension 17 of a supporting bracket 18 which in turn is secured to the base casting 1 by means of the studs 18'. The upper end of the registering rod 16' is rigidly secured by means of a nut threaded on the end thereof to one end of the arm 19' which at its other end is secured to the vertical reciprocating rod 19 by means of the securing pin 20. The upper end of the rod 19 is pivotally secured to a hand lever 21 by means of a pivot pin 22. One end of the hand lever 21 is secured by means of the pins 23 to the upper ends of a pair of links 24 which at their lower ends are connected by means of the pins 25 to a suitable extension of the bracket 18. A driving or hollow spindle sleeve 26 surrounding and rotatable on rod 19 is journaled in the bearing section 27 of the bracket 18. Secured to the sleeve or hollow spindle 26 is a key 28 by means of which it is slidably keyed to a sleeve or bearing member 29 which supports spindle 26 and is journaled for rotation in the bearing 30 of the bracket 18. Seated against the face 31 of the sleeve 29 is a bevel driving pinion 32 which is slidably keyed to and drives spindle 26 by means of key 28. Interposed between the bevel pinion 32 and bearing 27 is a spacing and protecting sleeve 33 provided with a key seat in which the key 28 slidably fits. Meshing with and driving the pinion 32 is a beveled gear 34 which is keyed to the end of a shaft 35 journaled in the bracket 18 and driven by a pulley 36. Keyed to and supported from the lower end of the hollow spindle 26 is a cup shaped cutter holder 37 to which a circular cutter 38 provided with the cutting edge 39 is secured. The internal diameter of the cutting member 38 is equal to the diameter to which it is desired to trim the fruit halves and the outer diameter thereof is slightly smaller than the diameter of the holes 7 and 8 in the turn table 6. The parts are so proportioned and arranged that cutter 38 will be disposed above the holes 7 or 8 which is directly beneath the cutter when the locating plunger 11 is in registration with one of the notches 10 and registering holes 14 and 15 are in alignment. Formed in the lower end of the rod 19 is a central bore 40 in which the upper end of a rod 41 is slidably fitted. A slot 42 is cut into the rod 41 and extending through the slot 42 is a pin 43 which limits the sliding motion of the rod 41 in the bore 40 and retains it in position. Threaded on the lower end of the rod 41 is a cup shaped compression member 42' provided with the spikes 43', and seated against the upper surface of the cup shaped member 42' is a helical spring 44. The upper end of the spring 44 seats against a collar 45 which is threaded on the lower end of the rod 19 which at the same time holds the knife supporting member 37 in position, and spindle 26 in position on and movable vertically with the rod 19 and the connected parts are held in ready open position by a coil spring 46 interposed between the handle 21 and the projecting shelf 47 of the bearing 27.

In operation of this form of device, spindle 25, together with cutter 38 are rotated on rod 19 by rotation of pulley 36 which is driven in any suitable manner. The fruit halves to be trimmed are placed in position in the receiving holes 7 and 8 formed in the turn table 6 and the turn table is positioned to bring one of the holes 7 or 8 in alignment with the cutter 38 in which position the locking plunger 11 will seat in one of the V-shaped notches 10 in the turn table. The operator then pulls the handle 21 downward against the tension of the spring 46, forcing the rod 19, together with the rotating sleeve 26 and registering rod 16' downward. The initial downward movement of parts causes the tapered end 16 of the registering rod to enter the hole 15 in the turn table 6 if the parts have been brought into proper alignment. If the turn table 6 is not properly positioned to align one of the holes 7 or 8 with the cutter 38, the end of the registering rod 16 will engage the upper surface of the turn table and prevent further downward movement of the cutter 38, in this manner preventing inadvertent engagement of the cutting edge of the cutter 38 with the metal surface of the turn table. If the parts are in proper alignment, the end of registering rod 16' will enter into the hole 15 and pass downward to the hole 14, locking the parts in proper position. Continued downward movement of the handle 21 will cause the prongs 43' of the cup shape member 42' to enter the fruit half 9 and the cup 42' engages the fruit pulp, compressing the pulp of the fruit and causing it to spread and come in contact with retaining wall of the receiving hole, filling the receiving hole and holding pulp against rotation. When the fruit pulp is compressed to a point where the tension of spring 44 will be overcome, the rod 19 will move downward with relation to the rod 41 and further movement of the handle brings the cutting edge 39 of the rotating cutter 38 into contact with the edges of the fruit.

The rotating cutter 38 trims off the outer edges of the pulp leaving the central part in a trimmed circular shape. The handle 21 is released after the pulp has been trimmed and spring 46 restores the parts to the position shown in Figure 1. As soon as the registering rod 16' is withdrawn, from the hole 15, the operator rotates the table 6 counter clock-wise in Figure 2. As the trimmed fruit reaches the recess or cut away portion 5 in the table 2, it will together with the trimmings, drop downward into a receptacle from which the trimmed pulp halves are separated and conveyed to the proper canning table, while the trimmings are carried to the pie kettles or slicing machines. When the table 6 has been rotated to 180 degrees, another fruit half will be in alignment with the cutter 38, the locking member 11 will register with the opposite locking notch 10 and another fruit half to be trimmed will be in alignment to the cutter 38. The handle 21 is again actuated to bring the rotating cutter into engagement with the fruit pulp, and a new half of the fruit to be trimmed is placed in the hole in the turn table, opposite the position of the cutter. In this way it will be seen that the fruit is rapidly and effectively trimmed into circular shape of uniform size.

In the form of invention so far described, no provision is made for trimming off a slice from the flat or face of the fruit halves being trimmed. In Figure 3 a modification of the invention is shown in which this may be accomplished. As shown in Figure 3, the operating parts for the compressing device, supported by the spindle 19, and the rotating cutter parts are substantially the same in construction and operation as set forth in the parts to which similar reference characters have been applied in Figure 1, and these parts are supported on a bracket indicated by reference numeral 18' in Figure 3. The remainder of apparatus is modified, however, as hereinafter set forth. The bracket 18' is supported on a post, secured to a post 47 by means of set screws and is secured thereto by means of a suitable securing bolt 48. Post 47 at its lower end is supported in a suitable base casting 49. On post 47 a bracket 50 is secured by a screw 51. The bracket is widened at its end as shown at 52 and is bored transversely to provide a receptacle 53 to receive the fruit to be operated upon. A kerf 54 is cut in the end of the bracket (see Figure 4) to receive a rotating cutting blade or knife 55 secured to shaft 56 that is carried in a bearing 57 on the end of an arm 58 arranged beneath the bracket. Arm 58 is provided with a sleeve 59 that surrounds post 47, the arrangement being such that arm 58 and blade 55 carried by it may be swung bodily about post 47 as a pivot. Arm 58 carries a transverse shaft 60 on which pulleys 61 and 62 are rotatably mounted. Secured to shaft 56 is a pulley 63. Rotary motion is transmitted to shaft 56 and the blade carried thereby by means of a belt 64, that passes over pulleys 61, 62 and 63 and over a driving pulley 65 secured to the drive shaft of the machine.

The rotating cutting blade 55 is surrounded by a safety guard 66 secured to bracket 50 in any convenient manner. Guards 67 and 68 further protect the operator from the cutting blade when said blade is swung from its operative to its inoperative position.

In the operation of this form of my invention the continuously rotating cutting blade 55 is swung to one side so that its cutting edge is outside the kerf 54. The operator inserts a fruit half in receptacle 53 and depresses lever 21 to trim the edge of the half in the manner above described. The under surface of the fruit is then trimmed by cutting a thin slice therefrom by swinging arm 58 and the cutting blade carried thereby so that the blade 55 enters the kerf 54 to effect this result as will be readily understood.

The invention has been above described in detail, but it should be understood that my invention does not reside in such details. In using the apparatus described a novel method of trimming fruit is employed. This method can be carried out by hand or by machines differing widely from that above specifically described. For example, I have used a concave disk secured to a spindle as a means to firmly press a fruit half into substantial contact with the walls of a cylindrical receptacle. This device was held in one hand and with the fruit compressed and spread as indicated, I trim the edges with a cylindrical cutter that is given a turning movement by the other hand.

What I claim as my invention is:

1. A method of trimming fruit of irregular shape which consists in subjecting the fruit to pressure to spread it laterally, and trimming the edges while maintaining said pressure.

2. A method of trimming fruit of irregular shape and having the core removed to form a hollow body, which comprises subjecting said body to a pressure acting in a direction to cause the edges of the fruit to spread laterally, and trimming said edges while maintaining said pressure.

3. A method of trimming fruit of irregular shape which consists in subjecting the fruit to pressure to spread it laterally, while confining it from undue lateral spreading, trimming the edges while maintaining said pressure, and trimming the under surface of the fruit while confined laterally.

4. A method of trimming fruit of irregular shape, which consists in subjecting the body of the fruit to pressure to spread the free edges laterally, while confining the fruit from undue lateral spreading, and trimming said free edges while maintaining said pressure.

5. A method of trimming halved fruit of irregular shape having the core removed to form a hollow body, which consists in subjecting said body to pressure applied in a direction substantially normal to the halving cut to expand the edges of the fruit, and then trimming said edges while maintaining said pressure.

6. A machine for trimming irregular fruit comprising means to support the fruit, means to yieldingly engage the body of the fruit to spread it laterally and means to trim the edges of the spread fruit.

7. A machine for trimming irregular fruit comprising a support for the fruit, a reciprocating head mounted over said support, said head including a cutter and means within said cutter yieldingly secured to said head for engaging the body of the fruit in advance of said cutter, and means to reciprocate said head.

8. A machine for trimming irregular fruit comprising a support for the fruit, a cylindrical cutter for trimming the edges of said fruit, means within said cutter to engage the body of the fruit, said cutter and means being mounted in a reciprocating head, said means being yieldably mounted and slidable in said head, means to reciprocate said head and means to rotate said cutter.

9. A fruit trimming machine comprising a support, a table carried by said support, a reciprocating head above said table, said head carrying a cylindrical cutter and yieldingly mounted means within said cutter designed to engage the body of the fruit with a yielding pressure before the cutter engages the edges of the fruit, means to reciprocate said head, and means to rotate said cutter with respect to said means.

10. A fruit trimming machine comprising a table having a cut away portion extending inwardly from its periphery, a disk having openings arranged to successively register with said cutaway portion rotatably mounted on said table, a reciprocating head mounted over said table, said head carrying a cylindrical cutter designed to enter said openings in succession, means to assure registry of said cutter and openings, and means to reciprocate said head and simultaneously advance said registering means.

11. A fruit trimming machine comprising a table having a recess to support the fruit, a standard having spaced parallel arms overhanging said recess, a sleeve supported between said arms, means to rotate said sleeve, a hollow spindle keyed to said sleeve and slidable therein, a rod within said spindle, fruit engaging means yieldingly secured to said rod, a cylindrical cutter secured to said spindle, a lever, said lever being connected to said spindle to reciprocate said spindle and rod.

12. A fruit trimmer comprising a table having a cutaway portion, a disk pivoted to said table, said disk having openings approximating the contour of the fruit designed to register in succession with said cutaway portion, means to spread the fruit in said openings, and means to trim the edges of the fruit.

13. An organized fruit trimming machine, comprising means to feed the fruit to a trimming station, said means being in the form of a receptacle approximating the size of a single fruit, a reciprocatory head at said station, said head carrying yieldable means to spread the fruit in said receptacle, and trimming means to trim the circumferential edges, and means to reciprocate said head and rotate said trimming means.

14. An organzied fruit trimming machine comprising a receptacle approximating in size the fruit to be trimmed, means arranged over said receptacle to yieldingly engage the fruit to spread it in said receptacle, means to trim the circumferential edges of the spread fruit and means to trim the under surface of the fruit in said receptacle.

15. An organized fruit trimming machine comprising a fixed support containing a recess approximating in size the size of the fruit to be trimmed, a reciprocatory head over said recess, said head carrying yieldable means to engage and spread the fruit in said recess, and a cutter to trim the circumferential edges, and a second cutter movable across the bottom of said recess to trim the under surface of the fruit in said recess.

16. An organized fruit trimming machine comprising a fixed support recessed to receive the fruit to be trimmed and provided with a kerf just above the plane of the bottom of said recess, means to yieldingly spread the fruit in said recess, means to trim the circumferential edge of the spread fruit, and a cutting blade mounted to swing into said kerf to trim the under surface of the fruit in said recess.

17. A fruit trimming machine comprising a recessed support for the fruit, said recess conforming roughly to the size of the fruit, a swingingly mounted cutter arranged adjacent said suport with the cutting edge of said cutter in a plane at right angles to the axis of said recess and spaced slightly from the bottom of said recess.

18. A fruit trimming machine as defined in claim 17 in which the cutter is a continuously rotating disk mounted on the swinging support.

In testimony whereof I affix my signature.

ARTHUR L. DUNCAN.